United States Patent [19]

Dobias et al.

[11] 4,297,159

[45] Oct. 27, 1981

[54] METHOD TO DIRECTLY BOND RUBBER TO METAL

[75] Inventors: Bohuslav Dobias, Regensburg, Fed. Rep. of Germany; Klaus Heckmann, Zum Aichahof 20, D-8400, Regensburg, Fed. Rep. of Germany

[73] Assignee: Klaus Heckmann, Regensburg, Fed. Rep. of Germany

[21] Appl. No.: 56,732

[22] Filed: Jul. 11, 1979

[30] Foreign Application Priority Data

Jul. 21, 1978 [DE] Fed. Rep. of Germany ....... 2832235

[51] Int. Cl.$^3$ ................................................. C09J 5/00
[52] U.S. Cl. ............................ 156/307.7; 152/357 R; 152/359; 156/110 A; 156/124; 156/283; 156/314; 156/319; 156/325; 156/326; 260/42.22; 260/42.32; 260/42.47; 427/409; 428/380; 428/381; 428/457; 428/462; 428/625
[58] Field of Search .................. 156/110 A, 314, 124, 156/319, 283, 325, 306, 326, 307.1, 307.7, 307.3; 427/409; 260/37 M, 42.22, 42.32, 42.47; 428/380, 457, 381, 462, 625; 526/335; 152/359, 357 R

[56] References Cited

U.S. PATENT DOCUMENTS

| 215,034 | 5/1879 | Adams | 156/325 |
|---|---|---|---|
| 2,037,749 | 4/1936 | Anderson | 156/306 |
| 2,399,019 | 4/1946 | Grinter et al. | 156/306 |
| 2,781,288 | 2/1957 | Polmanteer | 156/306 |
| 3,894,903 | 7/1975 | Brooks et al. | 156/306 |

FOREIGN PATENT DOCUMENTS

| 1108074 | 1/1956 | France | 156/307.7 |
|---|---|---|---|
| 604964 | 6/1946 | United Kingdom | 156/325 |
| 806933 | 1/1959 | United Kingdom | 156/325 |

OTHER PUBLICATIONS

Elkin, "Tellurium and Terrurium Compounds," Kirk-Othmer Ect. vol. 19, pp. 756 and 769–774, ®1969.

*Primary Examiner*—John J. Gallagher

[57] ABSTRACT

Process for the direct joining of rubber to metal surfaces by vulcanization using a rubber mixture containing the additives common for sulfur vulcanization wherein either the rubber mixture contains additionally tellurium, tellurium alloys and/or tellurium compounds as bonding aid, or that tellurium, tellurium alloy and/or tellurium compound is applied on the metal surface before vulcanizing.

11 Claims, No Drawings

METHOD TO DIRECTLY BOND RUBBER TO METAL

BACKGROUND OF THE INVENTION

The present invention relates to a process for the direct joining of rubber to metal surfaces.

A good bond of natural or synthetic rubber to metal is desirable for numerous purposes, but especially in the manufacture of vehicle tires with metal cord inserts. In this case, it is important that the bond between the metal and the rubber has as high an adhesive strength as possible, as well as good elasticity and long life. Only thus can optimum running properties and in particular the safety of vehicle tires at high speed be achieved. Insufficient adhesive strength and elasticity of the metal/rubber bond lead to early destruction of the tire body.

Aids in the adhesion of rubber mixtures to metal surfaces have included sulfur, proteins such as albumin, resorcinol-formaldehyde, poly-isocyanantes, heavy metal salts of organic acids, calcined heavy metal salts of organic acids, iron oxide 2-(2,4-dinitrophenylthio)-benzothiazole, heavy metal salts of hydroxy-benzoic acid as well as Co-napthenates.

The use of tellurium, tellurium alloys of tellurium compounds as bonding aids is not known in the prior art.

In Italian Pat. No. 378,711, a process is described wherein rubber and metal are durably joined through an intermediate layer. Applying an intermediate layer on the metal cord, however, involves increased technical cost as well as increased investments and production costs in tire manufacture and moreover constitutes an additional source for error or fault.

In French Pat. No. 960,629, a process for achieving good adhesive strength between metal and rubber mixtures is described wherein very high proportions of heavy metal compounds and sulfur are used in the rubber mixture. With this process, however, a hard rubber is formed which is not suitable for vehicle tires.

In DE-AS No. 1 130 159, a process for improving the adhesive strength of metal to rubber is described wherein a vulcanizable rubber mixture is vulcanized to a metal in the presence of a heavy metal salt of an organic acid, the heavy metal salt being used in a partially calcined or oxidized state. The disadvantage of this process is that the calcining process increases the cost of these additives so that their use in the mass production of tires is uneconomical. Besides, the adhesive strengths obtained with this process are not sufficient and in particular not for tires which are to be used at high speed.

In DE-OS No. 26 16 613, it is shown that, by the addition of metal salts of hydroxybenzoic acid to a rubber composition, the latter's adhesion to brass-plated steel cord is improved after the vulcanization; and the impairment of the adhesive properties by heat aging is reduced. However, when the rubber composition described in DE-OS No. 26 16 613 is used for making steel cord tires, it is found that the adhesion is insufficient and that it becomes worse with heat aging.

In Ullmann's Enzyklopedie der Technishen Chemie (Encyclopedia of Technical Chemistry), 9th Volume, Urban and Schwarzenberg, Munich-Berlin 1957, there is described on page 382, vulcanizing agents for cold vulcanization and for hot vulcanization. Under cold vulcanization, it is stated that the use of tellurium chloride among other compounds for the vulcanization of rubber instead of sulfur chloride has not been adopted in the practice. Under hot vulcanization, it is stated that also selenium and tellurium have been used for the vulcanization of rubber, but that the effect of these products is weaker than that of sulfur. On page 385, it is further stated that the tellurium salts of N-dialkyl-N-alkylaryl dithiocarbamic acids can be used as organic accelerators, but that these salts are little used in technical practice. There are no indications of any kind that tellurium, tellurium alloys or tellurium compounds can serve as means for bond improvement between metal surfaces and rubber.

It is the object of the present invention to provide a process for joining rubber mixtures to metal surfaces, in particular to metal cord, which does not have the disadvantages of the known processes and with which in particular better adhesive strengths between rubber and metal are obtained. Furthermore, the process of the invention is well reproducible and provides a minimum of error or fault sources, as well as low investment and production costs.

SUMMARY OF THE INVENTION

According to the present invention a process for the direct joining of rubber to metal surfaces by vulcanization using a rubber mixture containing the additives common for sulfur vulcanization is provided, which is characterized in that either the rubber mixture contains additionally tellurium, tellurium alloys and/or tellurium compounds as bonding aid, or that tellurium, tellurium alloy and/or tellurium compound is applied on the metal surface before vulcanizing.

Surprisingly, it was found that by adding tellurium to the rubber mixture normally used in sulfur vulcanization, the adhesive strength between metal and rubber can be substantially increased. Improvements up to 100% have been found. In testing the covering of the metal surface with rubber after the tearing out of a metal wire from a vulcanized sample is practically complete. The real adhesive strength, therefore, is higher than the measured adhesive strength. The good adhesive strength is achieved by addition of tellurium, tellurium alloys or tellurium compound is largely preserved also after the aging of the metal-rubber union and under corrosive conditions. The process according to the invention is suitable in particular for the manufacture of motor vehicle tires, aircraft tires, conveyor belts, drive belts, V-belts and hoses which are exposed to high stresses.

DESCRIPTION OF THE INVENTION

For the basic starting rubber mixture those compounds normally used may be employed. Natural rubber or synthetic rubber may be used, and the starting mixtures used in the process of the invention may contain any or all additives normally used in vulcanization processes and in particular in the manufacture of tires. The rubber mixture may also contain additional bonding aid systems than that of the present invention. In this latter case, when using the tellurium system, a further increase of the adhesive strength occurs.

As metal one can use all metal types, such as iron, copper, brass, zinc, aluminum or bronze, which have or are to be bonded with rubber. Preferably, however, metal cord is used, in particular, brass-plated steel cord. The metal surface with which the rubber mixture is to be joined must be clean, i.e., free of metal oxides, dust, oil, grease as well as moisture. Beyond that, the metal requires no additional cleaning or preparation. The joining between metal and rubber is effected in a manner known in the art.

For example, the starting rubber composition can be produced according to conditions as known from "Encyclopedia of Polymer Science and Technology," volume 12, pages 161–353 (rubber); bid, volume 14, pages 42–64 (tires and tire cords); ibid. volume 8, pages 184–185 (tire cord-immersion); ibid. volume 14, pages 740–756 (vulcanization); "Rubber Chemistry and Technology", 46 (4), pages 981–998 (Rubber-textile-cord bond and rubber-steel-cord bond); Ullmann's Encyclopedia of Technical Chemistry (in German), 9th volume, pages 305–424, Urban and Schwarzenberg, Munchen-Berlin 1957; as well as Ullmann's Encyclopedia of Technical Chemistry, volume 13, 4th revised and enlarged edition, published by Verlag Chemie, Weinheim-New York, pages 581–709.

The tellurium may be in its elemental form or as a tellurium alloy and/or a tellurium compound. The tellurium may be used as a metallic tellurium or in the form of its alloys, much as ferrotellurium and copper telluride. When using metallic tellurium or tellurium alloys, they are used preferably in powder form. Organic and inorganic tellurium compounds may be used, the latter to include also the non-stoichiometric metal tellurides. Examples of inorganic tellurium compounds are metal tellurides, such as the tellurides of iron, cobalt, nickel, tungsten, lead, tin, manganese and zinc. Examples of organic tellurium compounds are dialkyl tellurides with 1 to 6, preferably 1 to 4 and more particularly preferred 1 to 2 carbon atoms in the alkyl group. Examples of this are di-n-butyl tellurium, diethyl tellurium, dimethyl tellurium and dimethyl telluride iodide. As organic tellurium compounds one can further use diaryl ditelluride, e.g. diphenyl ditelluride. The level of carbon atom compound is by itself not significant provided the tellurium by itself is sufficiently active. However, the vapor pressure of the alkyl tellurium should, because of its toxicity be maintained as low as possible.

The quantity of bonding aid to be used depends on the composition of the rubber mixture. Surprisingly it does not depend on the sulfur content. 0.01 to 5 wt.%, preferably 0.1 to 2.5 wt.% most preferred 0.1 to 1 wt.%, referred to the weight of the total rubber mass, of tellurium, tellurium alloy or tellurium compound is sufficient. The proportions in the case of tellurium alloys or tellurium compounds being stated as percent by weight of elemental tellurium contained therein. Surprisingly in many cases, very small quantities of tellurium, e.g., in the range of 0.1 to 0.5 wt.%, are sufficient. Thus, one can obtain very good results when using 100 to 300 g tellurium per 100 kg rubber mixture.

The invention further concerns a rubber composition to be vulcanized in contact with metal, which is characterized in that it contains 0.01 to 5 wt.% tellurium, tellurium alloys and/or tellurium compounds, referred to the weight of the total rubber composition, the proportions in the case of tellurium alloys and tellurium compounds being stated in percent by weight of elemental tellurium. For this rubber mixture all statements made above in connection with the mentioned process apply.

The metal tellurides may be added to the rubber mixture directly or they may be produced by a reaction between finely divided metal and tellurium in the rubber mixture during the vulcanization process or be produced by a reaction of the telluride components, previously applied on the metal surface, at the boundary layer of metal surface and rubber, during the vulcanization process.

If the tellurium, tellurium alloys and/or the tellurium compounds are to be applied on the metal surface or if the tellurium compounds are to be produced on the metal surface, this may be done e.g. by electroplating processes, by vapor deposition or melting on or by immersion by application of a paste which can be prepared by means of a suitable liquid.

Application of the bonding system on the metal surface has two essential advantages over introducing the bonding system into the rubber mixture: Firstly, the mechanical properties of the rubber and of the bonding system can be optimized independently of each other, thereby ensuring greater flexibility in the selection of the parameters of the entire system; and, secondly, the consumption of tellurium, tellurium alloys and/or tellurium compounds is much less.

Tires made by the process of the invention show a much better adhesive strength between metal and rubber than tires made by known processes. This is important not only in the manufacture of new tires, as the tires are now exposed to higher speeds and harsher conditions than previously, but also in the retreading of tires. Nowadays the retreading of tires can often not be carried out because in the worn tires the bond between rubber and metal has become so inferior that, if the tires are retreaded, the adhesion values between metal and rubber stipulated in the standards are no longer ensured. But if the process of the invention is used in tire manufacture, then even after the tread is worn down the bond between rubber and metal cord is still so good and sufficient that retreading of the tires pays and also the retreaded tires fulfill the required standards.

As the tellurium bonding system has an especially high stability to corrosive influences, the retreading of truck tires must be mentioned here in particular. A comparison of rubber-metal unions which have been made according to the claimed process show a better adhesive strength than those made with the use of the known rubber compositions. In DE-OS No. 26 16 613, page 7, Table 2, retention coefficients are stated which are in the order of 68 to 72% and were obtained by aging for 72 hours at 100° C. The retention values achieved with the process of the invention are numerically comparable with the retention values named in DE-OS No. 26 16 613; however, they were obtained after heat aging at 130° C. for 72 hours. The metal-rubber union obtained according to the process of the invention thus shows a better heat stability than that obtained according to DE-OS No. 26 16 613.

The following examples will explain the invention:

In the following examples the vulcanizable rubber compositions are illustrative only and include those elements generally included by the industry, some of the components may be eliminated, modified and others added, as desired, and as is well known in the art, particularly in view of the references indicated in the earlier discussions.

EXAMPLE 1

A master batch is compounded with the following ingredients:

| STARTING BATCH | PARTS PER HUNDRED RUBBER PHR |
|---|---|
| Natural Rubber | 100 |
| Peptizing Agent, Zinc salt of pentachlorthiophenol "RENAZIT IV" | 0.30 |
| Carbon Black N330/HAF | 60 |
| Stearic Acid | 1.50 |
| "KORESIN" NA, paratert-butyl-phenol-acetylene resin | 3.00 |
| Antiaging Agent 4010NA, N-phenyl-N-isopropyl-p-phenylenediamine (Antioxidant) | 1.50 |
| Antiaging Agent HS, 2,2,4-trimethyl-1,2,dihydroquinoline (polymerized) (antiozonant) | 1.50 |
| Zinc Oxide | 10.00 |
| | 177.80 |

"RENAZIT" is a TM of Bayer A. G., Lever Kusen
KORESIN is a TM of the General Aniline & Film Corporation in a standard and conventional manner, the batch was then further compounded with sulfur and accelerators to form a base or finished mixture, as follows:

| FINISHED MIXTURE | PHR |
|---|---|
| Batch | 177.80 |
| Sulphur "CRYSTEX" A20, 83.3% | 3.00 |
| Accelerator D Z | .70 |
| | 181.50 |

"CRYSTEX" is a TM of the Stauffer Chemical Co.

To produce a mixture having a low sulfur content (3% PHR or 1.65% of the total weight of the finished base starting mixture).

The finished mixture was then divided into five samples, into each of four samples was further mixed tellurium, in the form of powdered elemental tellurium, in the respective amounts set forth in table I. No tellurium was added to the fifth part. All of the five parts were then vulcanized following the ASTM D-2229 on 0.175 mm steel cord being a brass plated surface and braided (7×4) for 15 minutes at 160° C. at a depth of embedment of 2.5 cm. The extent of adhesion is determined by conventional "pull-through" methods, such as described by D. Kenyon in Trans. IRI Vol. 38, page 165 (1962) or J. O. Wood in Rubber Chem Technology, Vol. 30, page 104 (1967) by which the force required to pull an embedded cord through and out of the sample is measured and compared over a period of time. Specifically, two hours after the vulcanization, a "reference" adhesion is determined by pulling a wire strand out of the sample. Thereafter, the vulcanized sample is subjected to a corrosion period consisting of keeping the individual sample for 16 hours at 90° C. in saturated water vapor to simulate the effect of actual conditions on automobile tires in use. Following this, wires are again pulled and adhesion is determined again. The results are summarized in Table I:

TABLE I

| SAMPLE Te in g/kg finished mixture | Adhesion (daH) Decca Newton | |
|---|---|---|
| | "reference" | after corrosion (16 hrs) |
| Ia 0.0 | 52 | 62 |
| Ib 0.425 | 126 | 102 |
| Ic 1.2 | 103 | 114 |

TABLE I-continued

| SAMPLE Te in g/kg finished mixture | Adhesion (daH) Decca Newton | |
|---|---|---|
| | "reference" | after corrosion (16 hrs) |
| Id 4.0 | 110 | 113 |
| Ie 8.0 | 116 | 107 |

The samples of Example I show that by the Te bonding system a stable union between metal surfaces and rubber mixtures of low sulfur content is produced. This is a great advantage over other bonding systems whose effectiveness depends on the presence of higher sulfur concentrations, the increased sulfur content leading to a decrease in strength, rupture elongation and notch impact strength to rehardening of the rubber.

Pneumatic tires, hoses and conveyor belts were formed of such samples, wherein a steel belted carcass was formed with a body having a rubber composition employing the tellurium as per this example.

EXAMPLE II

In this Example, the procedure of Example I was followed except that the initial starting batch was formulated as follows:

| STARTING BATCH II | PARTS BY WEIGHT (Kg.g) |
|---|---|
| RSS 1/800 | 15.55.0 |
| Zinc Oxide | 1.24.0 |
| Stearic Acid | 24.8 |
| AAA 4010 NA | 31.0 |
| AAA HS | 12.4 |
| "KORESIN" | 31.0 |
| Extender "Naftolen ZD | 38.8 |
| Carbon Black | 9.30.0 |
| | 27.47.0 |

RSS 1/800 - Rubber (Ribbed) Smoked Sheet, first quality 800 viscosity and the finished batch as follows:

| FINISHED MIXTURE II | |
|---|---|
| Batch | 23.55.00 |
| Sulfur("CRYSTEX SPECIAL") | 1.00.00 |
| Acellerator UREKA-BASE | 20.00 |
| | 24.75.00 |

UREKA-BASE is TM of Monsanto (dinitrophenyl-mercaptobenzothiazole)

The finished rubber mixture II has a higher sulfur content (7.5% referred to the rubber content, 4.05% referred to total finished mixture).

The finished mixture II was also divided into five parts, to each of four tellurium was added in the form of di-n-butyl tellurium in amounts as set forth in Table II and the five parts subjected to vulcanization with steel braid as in the Example I, and subsequently tested by the same methods. The results are summarized in Table II.

TABLE II

| Sample: Added quantity of bonding aid: Te in g/kg finished mixture | Adhesion (daN) | |
|---|---|---|
| | "reference" | after corrosion |
| IIa 0.0 | 64. | 82 |
| IIb 1.2 | 101 | 108 |
| IIc 1.6 | 126 | 114 |
| IId 2.4 | 101 | 99 |
| IIe 4.0 | 110 | 108 |

The results also show the beneficial results of the tellurium addition.

EXAMPLE III

In this Example, the procedure of Example I was followed except that the initial starting batch was formulated as follows:

| STARTING BATCH II | PARTS BY WEIGHT (Kg.g) |
|---|---|
| RSS 1/800 | 15.55.0 |
| Zinc Oxide | 1.24.0 |
| Stearic Acid | 24.8 |
| AAA 4010 NA | 31.0 |
| AAA HS | 12.4 |
| "KORESIN" | 31.0 |
| Extender "Naftolen ZD | 38.8 |
| "Vulkasil S" (50% silicic acid- 50% resorcinol/formaldehyde) | 1.86.0 |
| Carbon Black N326 | 7.44.0 |
| | 27.47.0 |

"Vulkasil" is TM of Bayer A. G. Leverkinsen.

and the finished batch as follows:

| FINISHED MIXTURE III | |
|---|---|
| Batch | 22.70.0 |
| Cofill | 64.0 |
| Sulfur (Crystex Special) | 96.0 |
| Accelerator UREKA BASE | 19.2 |
| Lubricant Hexa (60% hexamethylenetetramine, 40% naftolen) | 25.6 |
| | 24.74.8 |

The finished rubber mixture II has a higher sulfur content 7.46% referred to the rubber content, 3.88% referred to the total finished mixture.

In this example the batch was divided into three parts, to one of which was added a conventional silicic acid/resorcinal formaldehyde bonding agent, in one of which was added an amount of tellurium in the form of lead telluride as set forth in Table III. The samples were vulcanized about the steel cord and corrosion tested as above. The results are summarized in Table III.

TABLE III

| SAMPLE: | | |
|---|---|---|
| 1. Bonding aid: Resorcinol/Formaldehyde/ Silicic acid | | |
| 2. Bonding aid R/F/S plus | Adhesion (daN) | |
| Te in g/kg finished mixture | Reference | After corrosion |
| 0.0 | 64 | 82 |
| 1. 98.6 | 106 | 76 |
| 2. 98.6 + 0.5 | 162 | 106 |

Example III shows that the addition of the Te bonding system to a resorcinol/formaldehyde bonding system fully compensates the latter's essential disadvantages, namely the reduction of the adhesion due to the effect of moisture after the vulcanization.

Similar samples utilizing the finished mixture I, II and III were compounded with the addition of di-n-butyl tellurium, diethyl tellurium dimethyl tellurium and dimethyldiletturide, ferrotellurium and copper tellurium, in percentages of elemental tellurium, as indicated, with comparable results, since such results were merely duplicately and supplemental, they need not be repeated here. It was found that no matter what form the tellurium was in, i.e., compound or alloy, so long as the elemental content of tellurium was sufficiently reactive with the batch mixture component, within the preferred range, the increased bonding results were obtained.

EXAMPLE IV

A steel cord for vehicular tires, brass coated, as employed in the preceeding examples, was coated still further, by the conventional electroplating with a coating of elemental tellurium. The amount of tellurium deposited being 5 mg for each gram of wire, the total tellurium coating being between 0.1 to 1% wt.% of the rubber to be applied in the mixture vulcanized about the cord. The mixture was that of Example I. The coated cord was vulcanized, aged under corrosive conditions and tested as in Example I with similar results.

EXAMPLE V

A paste of 90% tellurium powder and 10% polyoil 110 was made. Afterward a steel cord, of the type described in example I, (brass coated 7/4×0.175 mm) was drawn through the paste. The cord was then wiped through a soft polyurethane foam. Upon being so wiped there remained on the wire 5 mg of Te for each 1 gram of wire. The wire was then vulcanized in the finished rubber composition of Example I (without additional tellurium) and tested by the same method and compared with a steel cord without the applied paste, but vulcanized in the same rubber composition.

The following were the results:

| SAMPLE | REFERENCE | AFTER CORROSION |
|---|---|---|
| without Te paste | 52 | 62 |
| with Te paste | 115 | 108 |

Polyoil 110 is TM of Chemische Werke Huls, harl.

What is claimed is:

1. A process for directly bonding a rubber composition to metal surfaces comprises:
   (a) contacting the surface of a metal selected from the group consisting of iron, copper, brass, zinc, aluminum, bronze and brass-plated steel with a composition comprising a vulcanizable rubber and conventional rubber-sulfur vulcanization compounding ingredients, a bonding aid selected from the group consisting of elemental tellurium and organotellurium compounds being used to improve the bond between said metal surface and said composition by incorporation thereof in said composition or by application thereof directly to said metal surface; and
   (b) subjecting the product of step (a) to pressure and temperature conditions sufficient to effect the vulcanization of said composition.

2. The process according to claim 1 wherein the amount of tellurium, in elemental form, is between 0.01 to 5 weight % of the rubber component of said composition.

3. The process according to claim 1 wherein said organotellurium compounds are selected from the group consisting of di-n-butyl tellurium, diethyl tellurium, dimethyl tellurium, dimethyl telluride iodide and diphenyl ditelluride.

4. In a process for directly bonding a rubber composition to metal surfaces wherein the surface of a metal selected from the group consisting of iron, copper, brass, zinc, aluminum, bronze and brass-plated steel is contacted with a vulcanizable rubber composition containing conventional rubber-sulfur vulcanization compounding ingredients and the resulting assembly is subjected to vulcanizing conditions, the improvement wherein a compound selected from the group consisting of elemental tellurium and organotellurium compounds is utilized as a bonding aid by incorporation thereof in said composition or by application thereof directly to said metal surface.

5. A process for directly bonding a rubber composition to a metal surface comprises:
   (a) contacting the surface of a metal selected from the group consisting of iron, copper, brass, zinc, aluminum, bronze and brass-plated steel with a composition comprising a vulcanizable rubber and conventional rubber-sulfur vulcanization compounding ingredients, said composition also containing a bonding aid selected from the group consisting of elemental tellurium, tellurium alloys and organotellurium compounds to improve the bond between said metal surface and said composition; and
   (b) subjecting the product of step (a) to pressure and temperature conditions sufficient to effect the vulcanization of said composition.

6. The process according to claim 5 wherein said tellurium alloys are selected from the group consisting of the tellurides of iron, cobalt, nickel, copper, tungsten, lead, zinc, tin and manganese.

7. The process of claim 5 in which the amount of sulfur incorporated as a vulcanization compounding ingredient is from 3 to 7.5 parts phr.

8. The process of claim 5 in which said tellurium alloys are selected from the group consisting of the tellurides of iron, copper and lead.

9. A process for directly bonding a rubber composition to a metal surface comprises:
   (a) applying a bonding aid selected from the group consisting of elemental tellurium and organotellurium compounds directly to the surface of a metal selected from the group consisting of iron, copper, brass, zinc, aluminum, bronze and brass-plated steel;
   (b) contacting the thus treated metal surface with a composition comprising a vulcanizable rubber and conventional rubber-sulfur vulcanization compounding ingredients; and
   (c) subjecting the product of steps (a) and (b) to pressure and temperature conditions sufficient to effect the vulcanization of said composition.

10. The process of claim 9 in which the amount of sulfur incorporated as a vulcanization compounding ingredient is from 3 to 7.5 parts phr.

11. The process of claim 9 in which said organotellurium compounds are selected from the group consisting of di-n-butyl tellurium, diethyl tellurium, dimethyl tellurium and dimethylditelluride.

* * * * *